Dec. 1, 1936.                G. WÜNSCH                 2,062,922
                         PAPER MACHINE CONTROL
                        Filed Feb. 19, 1934          3 Sheets-Sheet 1
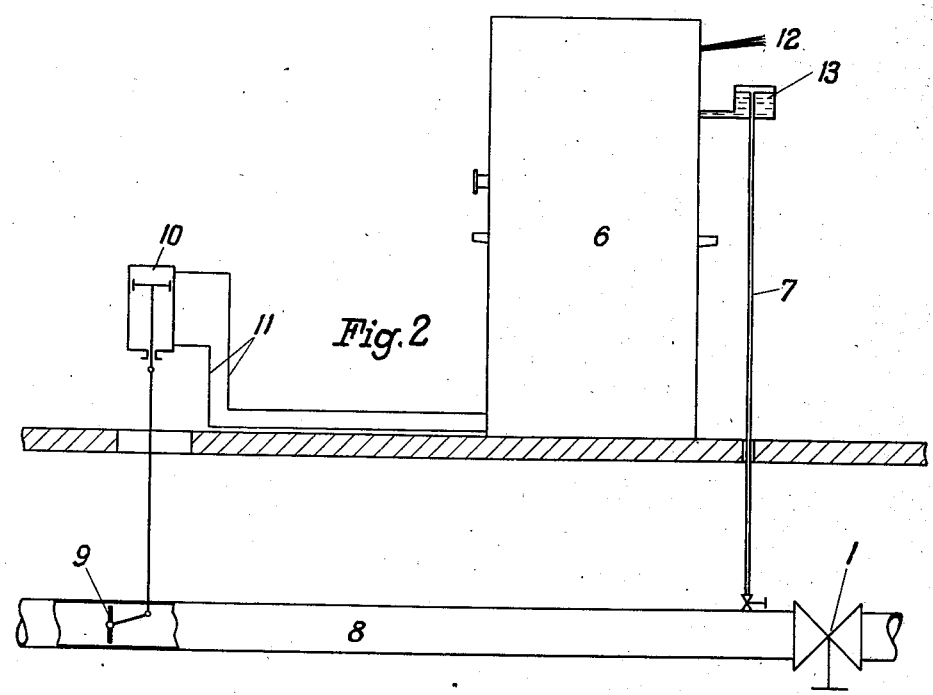
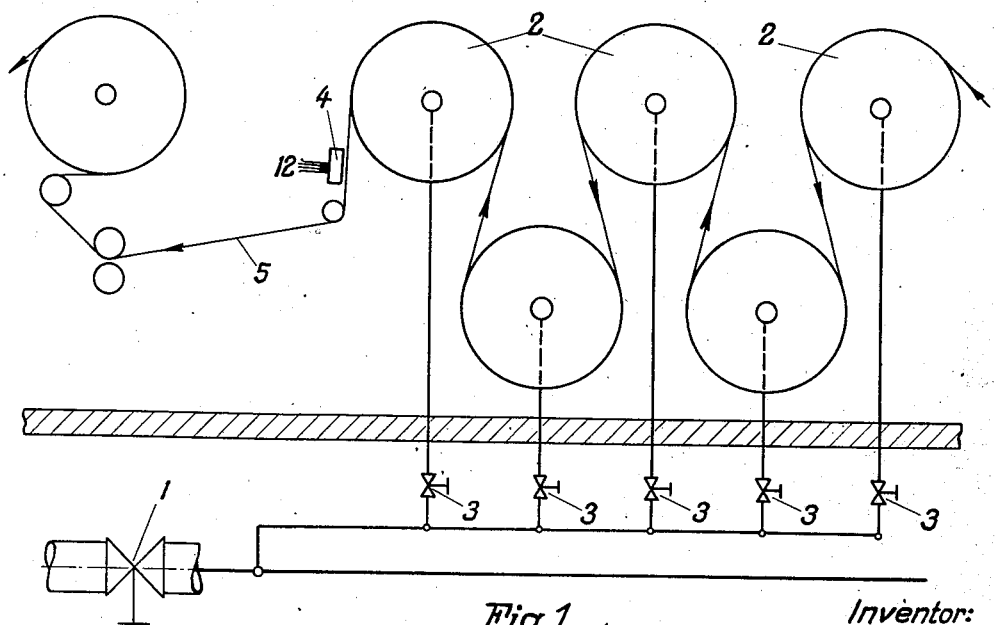
Inventor:
Guido Wünsch

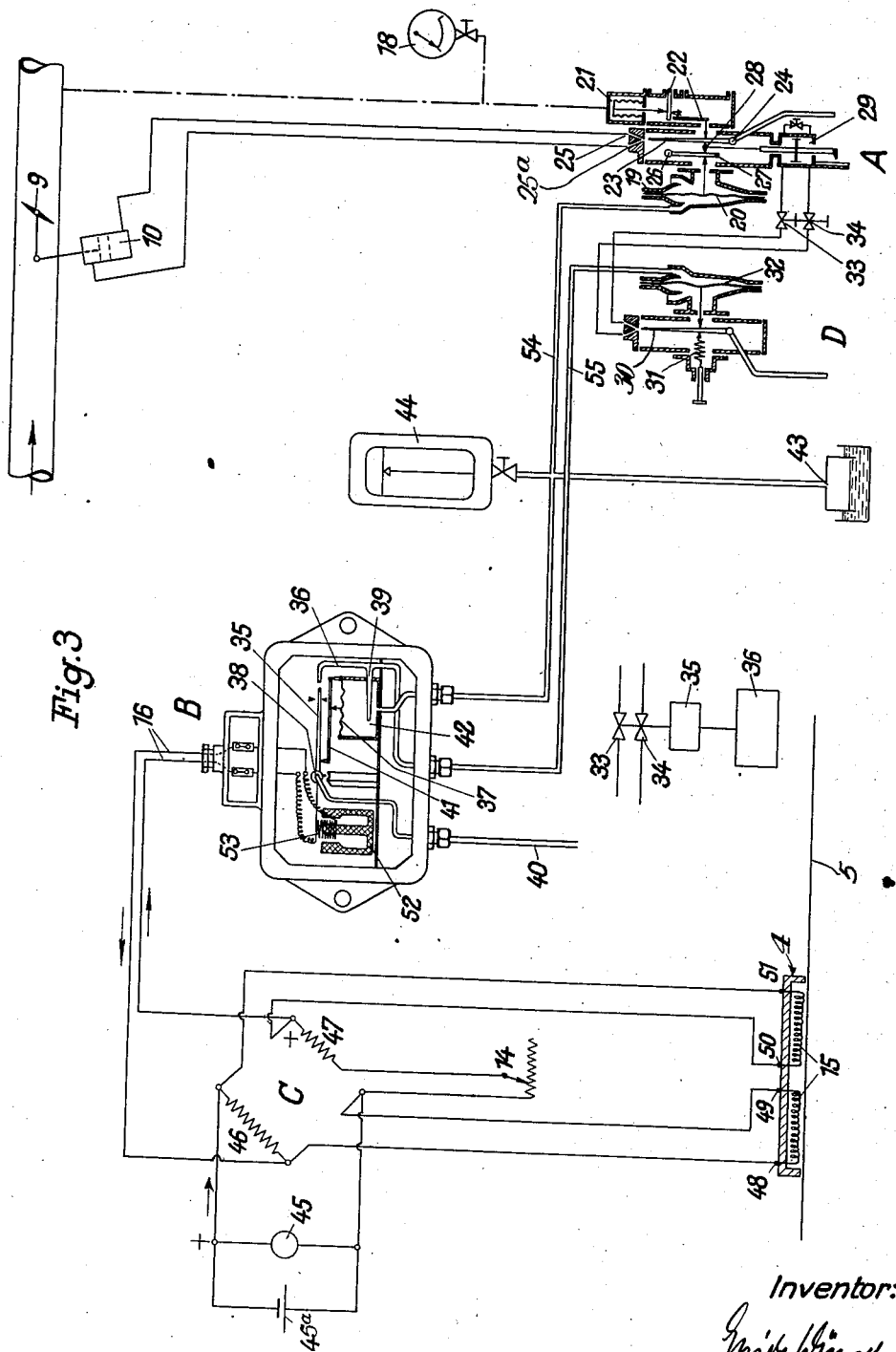

Dec. 1, 1936.  G. WÜNSCH  2,062,922
PAPER MACHINE CONTROL
Filed Feb. 19, 1934  3 Sheets-Sheet 3
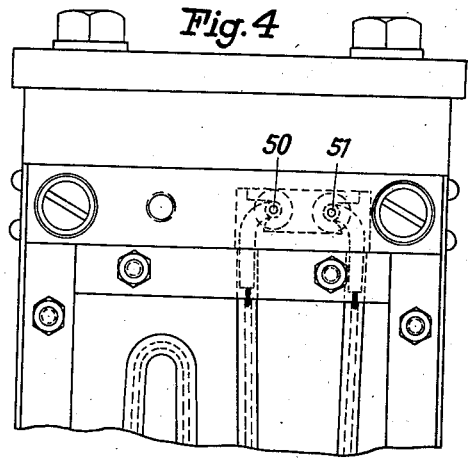
Fig. 4
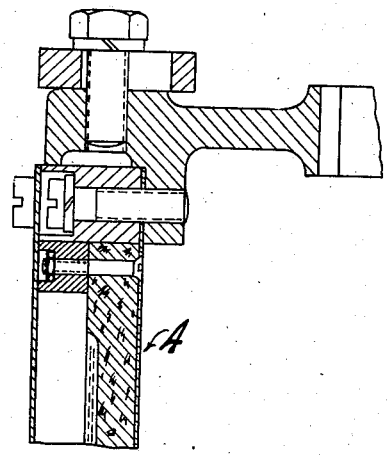
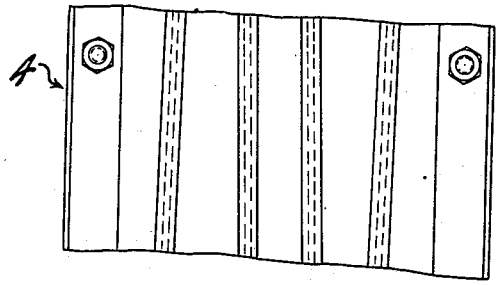
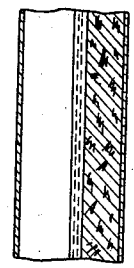
Fig. 5
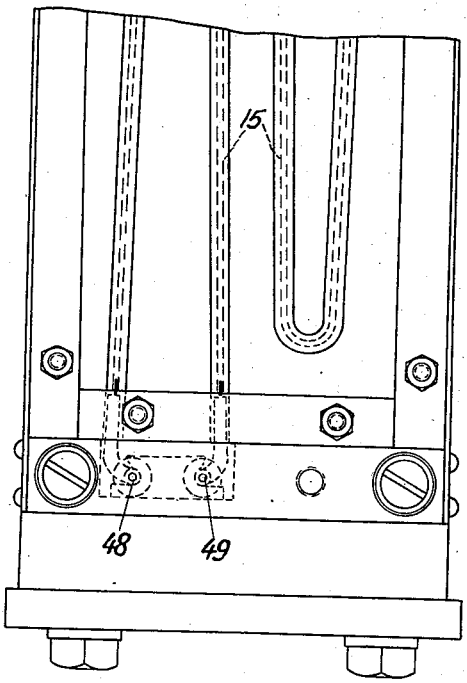
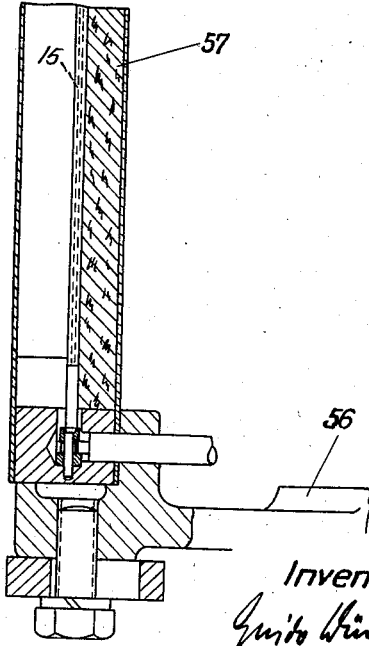
Inventor:
Gusto Wünsch Patented Dec. 1, 1936

2,062,922

UNITED STATES PATENT OFFICE 2,062,922

PAPER MACHINE CONTROL

Guido Wünsch, Berlin-Steglitz, Germany, assignor to Askania-Werke A. G. vormals Central Werkstatt Dessau und Carl Bamberg-Friedenau, a German company Application February 19, 1934, Serial No. 712,090
In Germany February 25, 1933

9 Claims. (Cl. 34—48)

This invention relates to a novel method and a new apparatus for controlling temperatures of paper or textile goods running through drying machines. More particularly, the object of the invention is to provide means for controlling the temperature or humidity of paper in very close limits. The idea is to maintain and automatically control the ratio between steam flow and the temperature or humidity of the paper or web, using a governing force which is proportional to the algebraic sum of a deviation plus the rate of deviation, to readjust proportioning control means operating normally in response to changes in temperature only. Although the disclosure of this invention refers to this particular application, the method can be applied to any condition of the paper which depends on the steam supply to the drying cylinders. For instance, various apparatus or instruments for measuring the humidity of the paper directly can be used with advantage in this control method.

Another object of the invention is to increase the output of drying machines, the apparatus being so designed that an operator has very close and fast control over the desired paper condition, and can run the machine to its full capacity.

Various other objects of this invention will appear in the following detailed description taken in connection with the accompanying drawings, in which:

Fig. 1 is a diagrammatic view of a paper drying machine having one form of the invention applied thereto;

Fig. 2 is a diagrammatic view of the control apparatus;

Fig. 3 is a diagrammatic, detailed layout of the controlling apparatus;

Fig. 4 is a detailed view of the temperature measuring instrument; and

Fig. 5 is a cross-sectional view of the instrument shown in Fig. 4.

For controlling the humidity of paper leaving paper machines, various methods have heretofore been used. Among other conditions, the temperature of the paper leaving the last dryer has been found to represent very accurately the humidity content of the paper and can be employed to control the supply of heating medium.

Referring to the diagrammatic view of a paper drying machine, 1 represents the main steam valve admitting steam to the various drying cylinders 2 which can be individually controlled by the throttling valves 3. The temperature responsive apparatus in this case is shown as being a resistance thermometer 4 using the well known Wheatstone-bridge principle, and is located close to the surface of the paper 5 running through the machine. It is understood that other temperature measuring instruments, such as thermocouples or expansion thermometers or the like, or any other instrument measuring the desired condition to be controlled, may be used in the method of control hereinafter disclosed.

In Fig. 2, 8 represents the main steam supply line leading to the paper machine. 9 is a control valve which, for simplicity, is shown as a butterfly valve but may be of any suitable design. 10 is a double acting, hydraulic, reciprocating motor which controls the position of butterfly 9. Two pipes 11 lead to the control board 6 which contains the hydraulic controls. The wires 12 coming from the resistance thermometer 4 (Fig. 1) are shown in the right upper corner; while the steam pressure is transmitted by line 7 in front of the valve 1. 13 is a condensate chamber to obtain a constant water level on which the steam pressure impulse acts.

The operation of this control will be more fully understood by having reference to Fig. 3. To illustrate the application of my invention, the control apparatus uses fluid jets which are delivered to two adjacent nozzles, as described in U. S. Patent No. 1,620,707.

In short, the principle applied is as follows: The resistance elements 15 of thermometer 4, which is a part of the Wheatstone-bridge C, delivers a current through leads 16 to a galvanometer which governs a fluid pressure in response to changes in the electric current representing temperature changes. One of the most important features of my invention is to use this fluid pressure which represents temperature or any other condition to be controlled and to apply the pressure to a diaphragm or the like in such manner as to balance the resulting force against the steam pressure. Control member A, which I will call a ratio control, maintains the ratio between temperature and steam pressure or, more specifically, between the pneumatic impulses representing temperature and the steam flow. For a given pressure of steam in the pipe lines leading to the paper machine, a definite relation between steam pressure and steam flow exists. The use of air as the medium to transmit an impulse representing temperature is not indispensable. Other means, for instance, springs compressed by a galvanometer relay or the like, will serve the same purpose. Instead of controlling steam pressure by the impulses, the steam flow could be controlled directly, as I consider the balancing of temperature or condition impulse (humidity, etc.) with steam flow as one of the main features of my invention.

A certain percentage in decrease of the temperature of the paper, and, hence, the air pressure representing the same, will call for a certain increase in flow of steam to compensate for this deviation. The ratio control will therefore open the steam valve by means of the operating motor 10 until the increased steam pressure, which is indicated by gauge 18, will restore the balance of the ratio control means.

With constant paper temperature and, therefore, constant air pressure acting upon diaphragm 20 from the left side of the ratio relay A, a variation in steam pressure acting upon a bellows type diaphragm 21 and through a lever system 22 at the right hand side, on the jet tube 23, will immediately be corrected, as the relay will then act as a pressure control.

The ratio relay A comprises the hollow pipe or jet tube 23 which is pivotally mounted to oscillate on the hollow pivot 24. A pressure fluid, preferably oil, from a source of pressure not shown, is admitted to the pipe and leaves its jet nozzle under high velocity. The pressure head building up in the two adjacent openings 25 and 25a, which are in front of the jet pipe nozzle, will be the same as long as the pressure jet hits directly between both openings. A deviation to the right or the left will immediately result in a pressure increase in the corresponding opening and a piston in the cylinder of motor 10 will start to operate and thereby actuate the valve 9.

The force exerted by the steam pressure on the bellows type diaphragm 21 is balanced against the air impulse acting on diaphragm 20. The ratio of the two forces balancing each other can be adjusted by means of a variable lever system which consists of the jet pipe proper 23, a lever 27 pivoted at 26 and a sliding spacer or block 28 between the jet pipe and the lever. Ratio sliders of this general type are disclosed in my Patents Nos. 1,558,529 and 1,721,800.

In the median position of the spacer, as shown in Fig. 3, the ratio is 1:1. A movement of the spacer toward the pivot 26 will increase the force transmitted to the right by diaphragm 20 against jet tube 23 and will therefore require an increased steam pressure to balance it. A movement away from the pivot 26 will have the opposite effect.

Thus far, we shall get, as a result of the control, a proportional increase of steam flow with an increase in the pressure fluid impulse caused by a decrease in temperature. As many variable factors determine the effect of such an increase of flow, it is evident that such an increase in flow will, for different speeds of the paper machine and for different room conditions, only partly compensate for the deviation from the set value.

It is therefore necessary to reset the ratio automatically to meet all these conditions. This is done by means of a slower operating control mechanism D which changes the ratio slider position by operating a double acting reciprocating motor 29 having a piston connected by a piston rod to the ratio slider or spacer 28. For the sake of simplicity, this control is shown as also being of the hydraulic type, using the jet pipe principle.

A jet pipe 30 receives fluid under pressure from a pump or other source (not shown) which may also supply fluid to jet pipe 23 in control A. On the right hand side, it receives an impulse on diaphragm 32 through conduit 55 which is balanced against the action of a spring 31.

In order to regulate the speed of the piston 29 in its operating cylinder, two adjustable valves 33 and 34 are provided in the pipes leading to the cylinder. These valves can be either stationary or rotating. In the first case, a continuous control is obtained and, in the second case, an intermittent control. For the latter purpose, the two valves may be operated by a clock mechanism or motor 36 which is geared down by means of gearing 35 to the desired speed (see the small diagrammatic view in Fig. 3).

The impulse acting on diaphragm 32 is not the same as the one acting on diaphragm 20 but is proportional to the sum of the temperature + C times the rate of temperature change. The factor C is zero only in special cases. This application of an impulse or governing force, which is proportional to condition change + C times the rate of condition change, is disclosed in my Patent 1,920,827. Its purpose is to obtain a very stable control and to effectively avoid great deviations from the set value before they can be realized.

Governing means which produces a fluid pressure proportional to the temperature and a second impulse which is proportional to the total of the temperature plus a constant times the rate of temperature change, is shown at B. Its design and performance has been described in detail in my copending application Ser. No. 622,168. The electric bridge current is transmitted through leads or conductors 16 to the governor, including a galvanometer having a coil 53 floating in the magnetic field of its casing 52. Instead of the ordinary galvanometer needle, a jet pipe 35, pivoted at 38, is used. Compressed air or gas is admitted to the jet pipe, coming from a source (not shown) through a pipe 40. The jet pipe oscillates in front of nozzle 36 which communicates, through a capillary tube 39, with the lower side of the diaphragm 37. A lever 41 transmits the force of the diaphragm to the jet pipe. The instrument acts on the principle of a weighing scale. A decrease in temperature of the paper, for instance, will move the galvanometer coil upwards and the nozzle downwards. This will cause more air to enter nozzle 36 and the resulting increase in pressure below diaphragm 37 will restore a new state of equilibrium. The pressure therefore will be inversely proportional to the temperature. This pressure is transmitted through pipe 54 to the ratio control A. As the pressure in chamber 42 is directly proportional to the volume of air in it, the flow of air to or from this chamber which changes the pressure in it, is proportional to the change in temperature. The pressure in pipe 54 acting on diaphragm 20 is therefore proportional to changes in temperature as disclosed in my Reissue Patent No. 19,276 and copending application Ser. No. 565,489. By measuring the flow of this air by means of a capillary tube 39 an additional pressure is built up in nozzle 36 which, as the pressure drop through a capillary tube is proportional to the flow, is directly proportional to the rate of air flow and therefore to the rate of temperature change. The impulse transmitted through a pipe 55 to control the regulator D is therefore proportional to the algebraic sum of the temperature and a constant times rate of temperature change. To increase the volume of chamber 42, a water bell 43 is connected to line 54.

A recorder 44 is connected to pipe 54 to show the changes in pressure caused by changes in the electrical impulses or the Wheatstone-bridge current.

The control D therefore starts to operate not only as changes in temperature take place but at the same time it makes adjustments proportionally to the rate of change. By choosing the right dimension for the water bell 43 and capillary tube 39 the factor of proportion or constant C can be given any desired value. By omitting capillary tube 39 and bell 43 the constant will become zero.

As hereinbefore explained, the temperature is measured by means of a resistance thermometer, although other means such as thermocouples, etc. could be used for the same purpose. The Wheatstone-bridge C consists of two resistances 15 used for measuring the temperature by changes in resistance, constant resistances 46 and 47, a rheostat or variable resistance 14, a battery 45 and a voltmeter 45a.

When the rheostat 14 is in a definite position the governing fluid pressure recorded by 44 will be directly proportional to temperature. The desired control setting has to be done in this case by means of spring 31. On the other hand when spring 31 is set at a constant position the control point can be set or regulated by means of rheostat 14. In this case the recorder will show only deviations in pressure from changes in the temperature.

Fig. 4 and Fig. 5 show the design of the resistance thermometer. 48, 49, 50 and 51 designate the respective terminals in Figs. 3 and 4. The resistance wire is shown as being imbedded in cork. Greatest care should be taken to reduce time lags in response by decreasing masses of material. The thermometer is mounted on brackets 56 supported on the machine frame behind the last dryer roll and can be easily lifted from the paper if necessary.

The temperature impulses created by the feeler in response to the varying humidity or moisture content of the web, operate the galvanometer to create separate pneumatic impulses, one being inversely proportional to the temperature impulses and the other being inversely proportional or responsive to the algebraic sum of the change in temperature plus the rate of change of the temperature. This latter pressure impulse is created in the same manner as is disclosed in Patent No. 1,620,707. The main steam regulator is actuated by the first of the above described pressure impulses and by the steam pressure on the delivery side of the control valve. This assures a constant ratio between the steam supply and the moisture content of the web. Now, the second regulator D, actuated by the second impulses, readjusts the main steam regulator by slowly changing the ratio setting, whereby the main steam regulator is always set to maintain the original temperature impulses and, hence, the moisture content of the web substantially constant.

Obviously, the present invention is not restricted to the particular embodiment thereof here shown and described. Moreover, it is not indispensable that all the features of the invention be used conjointly, since they may be employed advantageously in various combinations and sub-combinations.

I claim:

1. That method of governing the temperature or other controllable condition of a web of paper or fabric passing through a drying machine which is characterized by continuously measuring the condition of the web to set up a controlling force always proportional to changes in the condition; creating separate governing forces, one of which is directly responsive to changes in said condition and the other of which is responsive to the algebraic sum of any condition change and the rate of change; applying the first named governing force to regulate the supply of steam to the machine proportionally to the rate of flow; and applying the second named governing force to vary the ratio between the steam flow and the force representing said condition whereby to maintain the condition substantially constant.

2. That method of governing the temperature or other controllable condition of a web of paper or fabric passing through a drying machine, which is characterized by continuously measuring the condition; creating electrical impulses responsive to changes in said condition; creating two governing forces in the form of pneumatic pressures, one of which is directly responsive to changes in said condition and the other of which is responsive to the algebraic sum of any condition change and the rate of change; applying the first named governing force to operate a regulator which controls the supply of steam to the machine proportionally to the rate of flow; and applying said second named governing force to modify the action of the regulator and thereby maintain the condition substantially constant.

3. That method of controlling a condition of a moving web in a drying machine having a surface over which the web passes heated by a heating medium which is characterized by creating governing impulses in response to changes in said condition; applying some of said impulses to operate a primary regulator for controlling the delivery of heating medium to the machine; applying other of said impulses proportional to the rate of flow of the heating medium to the machine in opposition to said impulses in the primary regulator thereby partially compensating for changes in said condition; and applying some of said governing impulses simultaneously to modify the ratio between the flow of the heating medium and the changes in said condition in such manner as to eliminate excessive final changes in the condition.

4. Control mechanism for a paper drying machine comprising, in combination, a resistance thermometer connected to measure the temperature of the moving paper web and create controlling electrical impulses which are proportional to the temperature changes; master governing means including a galvanometer and a combined pneumatic device controlled by the electrical impulses to create separate pneumatic governing forces in the form of pneumatic impulses, one force being directly responsive to temperature changes and the other force being responsive to the sum of the temperature change and the rate of temperature change; a steam flow regulator connected to be operated by the first named governing force and thereby vary the steam supply to the machine in proportion to deviations in temperature from a set value; and a second regulator operated by said second governing force and connected to readjust the steam flow regulator in accordance with the total of temperature change and the rate of temperature change.

5. Control apparatus for steam heated drying machines of the class described comprising, in combination, means operable in response to changes in a condition of a web passing through the machine to create separate impulses, one impulse being proportional to the change in said condition and the other impulse being proportional to the algebraic sum of the change in the condition plus the rate of change in the condition; a regulator controlling the delivery of steam to the machine connected to be operated by the impulses which are proportional to the change in the condition and counterbalancing impulses which correspond to the rate of steam flow to the machine; and a second regulator operated by the other impulses connected to modify the ratio between said counterbalanced impulses in such manner as to maintain the condition of the web substantially constant.

6. Control apparatus for web drying machines of the class described comprising, in combination, means operable in response to changes in a condition of a web passing through the machine to create governing impulses, some of said impulses being proportional to changes in said condition and the other impulses being proportional to the algebraic sum of the change in the condition plus the rate of change in said condition; a primary regulator operable in response to said impulses which are proportional to changes in said condition connected to change the rate of flow of heating medium to the machine proportionally to the changes in said condition; and a secondary regulator operable in response to said other impulses and connected to modify the ratio between the flow of the heating medium and the changes in the condition and thereby maintain the condition substantially constant.

7. Control apparatus for paper drying machines comprising, in combination, a governing device connected to create controlling impulses which are proportional to changes in a condition of the paper; a primary regulator controlling the delivery of heating medium to the machine connected to be operated by said impulses and counterbalancing impulses corresponding to the rate of flow of the heating medium to the machine; and a secondary regulator also connected to be operated by impulses created by said governing device having ratio governing means associated with the primary regulator connected to control simultaneously the ratio of the counterbalanced impulses and thereby vary the steam supply in such manner that the condition of the paper is kept substantially constant.

8. In control apparatus for steam heated paper drying machines of the character described, a primary regulator controlling the delivery of steam to the machine connected to be operated in response to changes in condition of the paper and the rate of steam flow to the machine partially to compensate for the changes in said condition; and a second regulator connected to be operated in response to a change in condition plus the rate of said change in condition governing the action of the first regulator to eliminate excessive final deviations in the condition.

9. In control apparatus for drying machines including means heated by a heating medium, means for controlling a condition of a moving web passing over the surface of said heated means comprising means for creating governing impulses in response to changes in said condition; a regulator for controlling the supply of said heating medium to said heated means; means for applying some of said impulses to operate said regulator proportionally to said changes and thereby control the rate of flow of said heating medium in response to said impulses; and other means controlled by other of said governing impulses simultaneously to modify the ratio between the rate of flow of the heating medium and the changes in said condition in such manner as to eliminate excessive final changes in the condition.

GUIDO WÜNSCH.